(12) United States Patent
Ishiga

(10) Patent No.: US 7,973,850 B2
(45) Date of Patent: Jul. 5, 2011

(54) IMAGE PROCESSING APPARATUS AND IMAGE PROCESSING METHOD

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 528 days.

(21) Appl. No.: 11/992,480

(22) PCT Filed: Sep. 26, 2006

(86) PCT No.: PCT/JP2006/319060
§ 371 (c)(1),
(2), (4) Date: Mar. 24, 2008

(87) PCT Pub. No.: WO2007/037229
PCT Pub. Date: Apr. 5, 2007

(65) Prior Publication Data
US 2009/0135267 A1    May 28, 2009

(30) Foreign Application Priority Data

Sep. 29, 2005  (JP) ................................. 2005-284568

(51) Int. Cl.
*H04N 5/225* (2006.01)
*H04N 5/228* (2006.01)

(52) U.S. Cl. ...................................... 348/335; 348/222.1

(58) Field of Classification Search ............... 348/222.1, 348/273, 335, 345
See application file for complete search history.

(56) References Cited

U.S. PATENT DOCUMENTS

| | | | |
|---|---|---|---|
| 5,170,441 A | | 12/1992 | Mimura et al. |
| 2001/0016083 A1 | | 8/2001 | Hayashi et al. |
| 2002/0001409 A1 | * | 1/2002 | Chen et al. .................... 382/167 |
| 2007/0035641 A1 | | 2/2007 | Yamada et al. |
| 2009/0074324 A1 | * | 3/2009 | Ishiga et al. .................. 382/282 |

FOREIGN PATENT DOCUMENTS

| | | | |
|---|---|---|---|
| EP | 1 528 797 A2 | | 5/2005 |
| JP | A-10-319518 | | 12/1998 |
| JP | A 2001-103358 | | 4/2001 |
| JP | 2002-344978 | * | 11/2002 |
| JP | A-2003-060983 | | 2/2003 |
| JP | 2004-241991 | * | 8/2004 |
| JP | A 2005-45433 | | 2/2005 |

OTHER PUBLICATIONS

Dec. 28, 2010 Office Action in European Application No. 06798326.2.
Feb. 22, 2010 Search Report issued in European Patent Application No. 06798326.2.

* cited by examiner

*Primary Examiner* — Hung H Lam
(74) *Attorney, Agent, or Firm* — Oliff & Berridge, PLC

(57) ABSTRACT

An image processing apparatus includes a discriminating unit that discriminates a color component originating in an image structure in an image captured through an optical system from a color component attributable to a chromatic aberration of the optical system, and a correction unit that corrects the color component attributable to the chromatic aberration of the optical system based upon discrimination results provided by the discriminating unit.

11 Claims, 12 Drawing Sheets

FIG.2
MECHANISM WITH WHICH COLOR BLEEDING ATTRIBUTABLE
TO LONGITUDINAL CHROMATIC ABERRATION OCCURS
(a) SIGNAL LEVEL
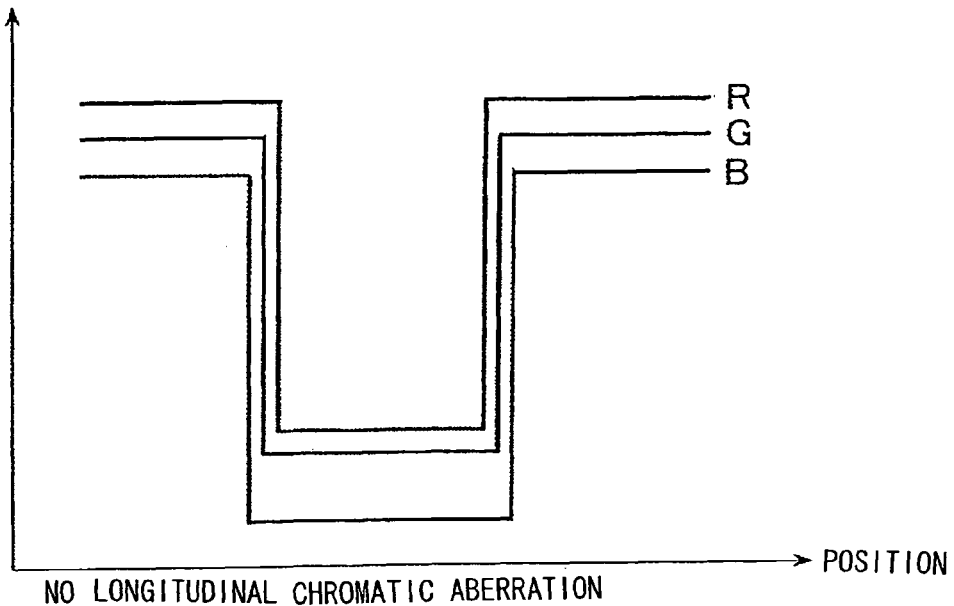
NO LONGITUDINAL CHROMATIC ABERRATION
(b) SIGNAL LEVEL
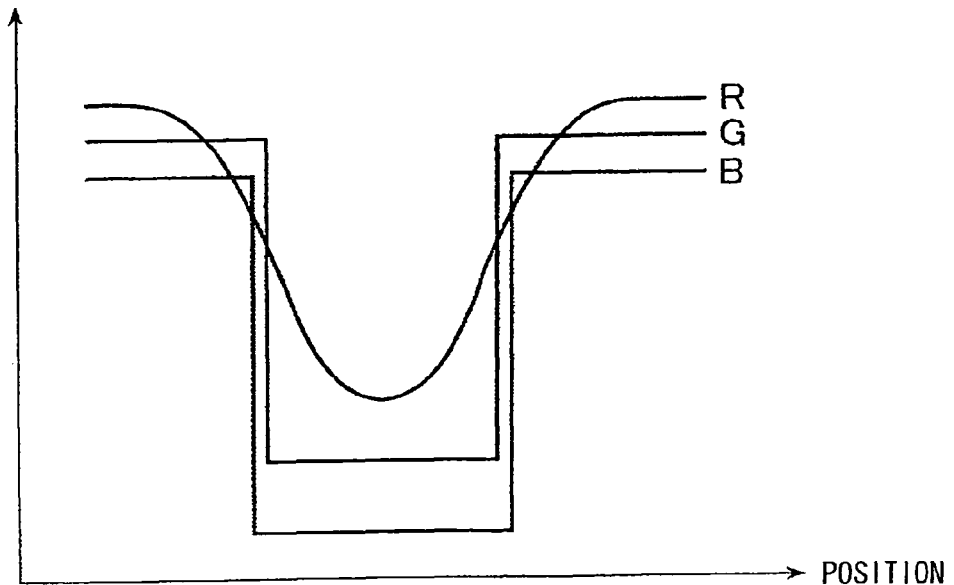
SIGNIFICANT LONGITUDINAL CHROMATIC ABERRATION IN R-COMPONENT FIG.3
(a)
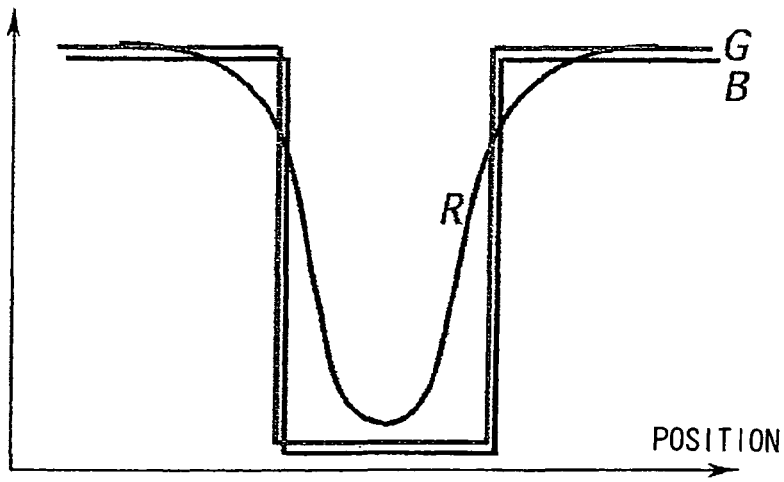
(b)
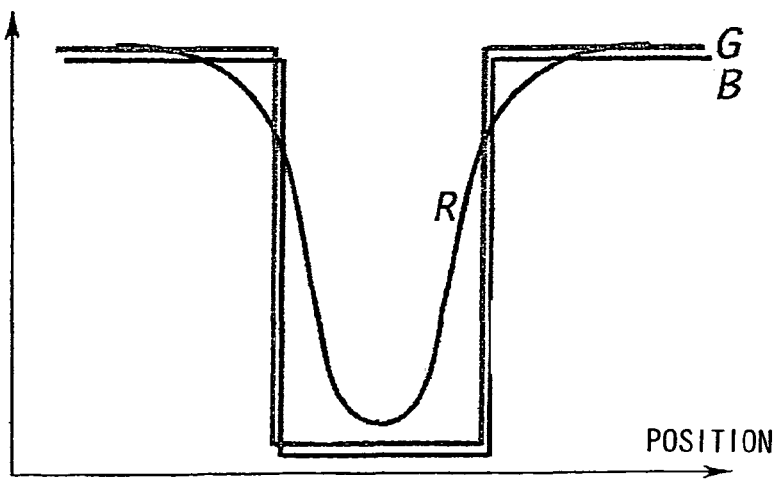

FIG.7
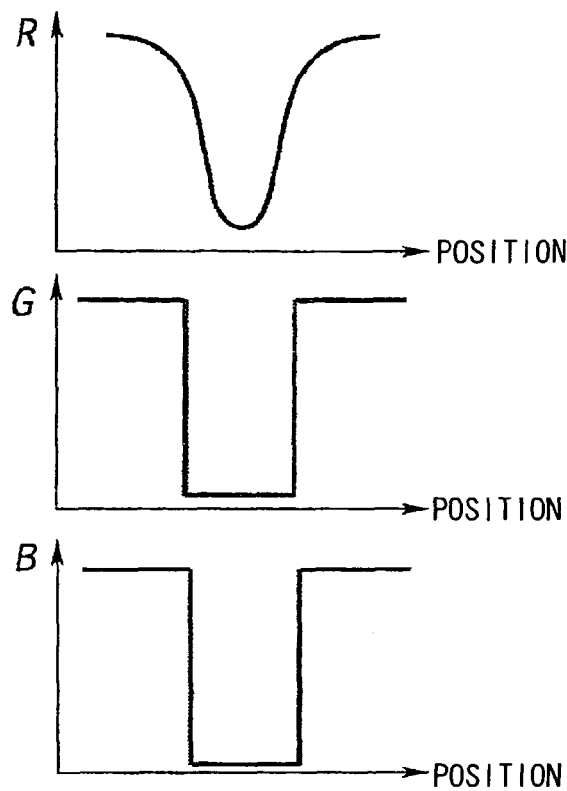
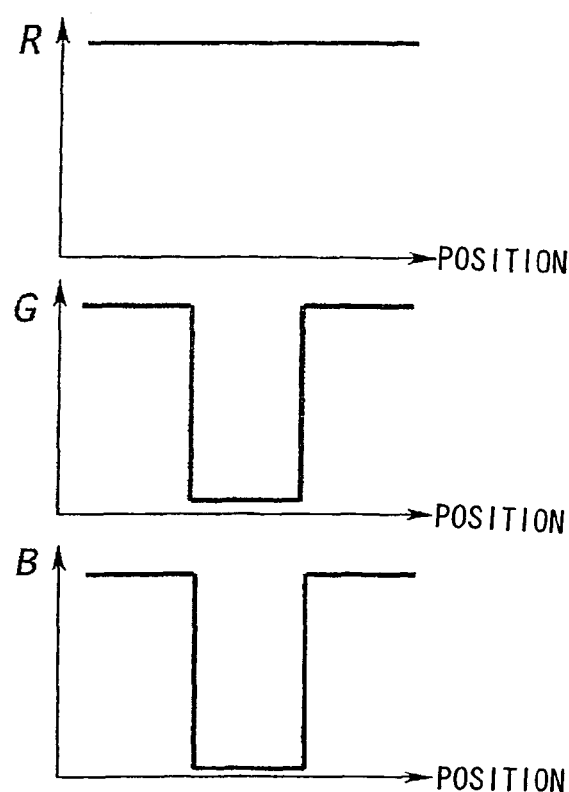

FIG.8

| COORDINATES [i, j] | i-3 | i-2 | i-1 | i | i+1 | i+2 | i+3 |
|---|---|---|---|---|---|---|---|
| j-3 | B | G | B | G | B | G | B |
| j-2 | G | R | G | R | G | R | G |
| j-1 | B | G | B | G | B | G | B |
| j | G | R | G | R | G | R | G |
| j+1 | B | G | B | G | B | G | B |
| j+2 | G | R | G | R | G | R | G |
| j+3 | B | G | B | G | B | G | B |

BAYER ARRAY

FIG.9

$\langle\ \rangle_{3\times 3} =$ 
| | | | | |
|---|---|---|---|---|
| | | | | |
| | 1 | | 1 | |
| | | 4 | | |
| | 1 | | 1 | |
| | | | | |
 /8

$\langle\ \rangle_{5\times 5} =$
| | | | | |
|---|---|---|---|---|
| | | 1 | | |
| | 2 | | 2 | |
| 1 | | 4 | | 1 |
| | 2 | | 2 | |
| | | 1 | | |
 /16

$\overline{Cr3} =$ /49 ⊗ Cr3

(7×7 grid with values: row1 col5=1; row3 col2=3, col4=6, col6=3; row4 col1=1, col2=6, col4=9, col6=6, col7=1; row5 col2=3, col4=6, col6=3; row7 col4=1) — 10a

IMAGE PROCESSING APPARATUS AND IMAGE PROCESSING METHOD

TECHNICAL FIELD

The present invention relates to an image processing apparatus and an image processing method that may be adopted when correcting an image captured through an optical system.

BACKGROUND ART

The chromatic aberration correction-devices known in the related art include that disclosed in patent reference 1. The chromatic aberration correction device corrects focal point misalignment manifesting among R, G and B colors in a color image represented by the three colors due to the inclination with which the R, G and B plane image sensor is respectively disposed by applying a smoothing filter or a sharpening filter to color planes other than a reference color plane while determining variable filter parameters so as to achieve the maximum level of correlation among the color planes.
Patent reference 1: Japanese Laid Open Patent Publication No. 2001-103358

DISCLOSURE OF THE INVENTION

Problems to be Solved by the Invention

The device in the related art is designed on the assumption that the R, G and B planes have similar image structures and that better correlation among the color planes can be achieved simply by adjusting the level of sharpness. However, a captured image normally contains various image-structures and the assumption does not apply in, for instance, a chromatic color structure area. The image over such a chromatic image area may become seriously disrupted after being subjected to the correction processing. In other words, if the correction method adopted in the device in the related art is used in an attempt to correct color bleeding resulting from a longitudinal chromatic aberration, the image structures in the image may become disorganized.

Means For Solving The Problems

According to the 1st aspect of the present invention, An image processing apparatus, comprises a discriminating unit that discriminates a color component originating in an image structure in an image captured through an optical system from a color component attributable to a chromatic aberration of the optical system.

According to the 2nd aspect of the present invention, in the image processing apparatus according to the 1st aspect, it is preferred that the image processing apparatus further comprises a correction unit that corrects the color component attributable to the chromatic aberration of the optical system based upon discrimination results provided by the discriminating unit.

According to the 3rd aspect of the present invention, in the image processing apparatus according to the 1st or the 2nd aspect, it is preferred that the discriminating unit alters a sharpness of at least one color component of the captured image and discriminates the color component originating in the image structure in the captured image from the color component attributable to the chromatic aberration of the optical system based upon a difference in color response characteristics between at least two color components including the color component in correspondence to which the sharpness has been altered.

According to the 4th aspect of the present invention, in the image processing apparatus according to the 3rd aspect, it is preferred that if the color response characteristics between the two color components is represented by a monotonically decreasing function relative to a change in the sharpness, the discriminating unit determines that the color component in correspondence to which the sharpness has been altered is a color component originating in an image structure in the captured image.

According to the 5th aspect of the present invention, in the image processing apparatus according to the 3rd aspect, it is preferred that if the color response characteristics between the two color components is represented by a function with a minimal point relative to a change in the sharpness, the discriminating unit determines the color component in correspondence to which the sharpness has been altered is a color component containing a color component attributable to a chromatic aberration of the optical system.

According to the $6^{th}$ aspect of the present invention, in the image processing apparatus according to the $3^{rd}$ aspect, it is preferred that the discriminating unit alters the sharpness of at least one color component of the captured image by applying a filter within the one color component or alters the sharpness of at least one color component of the captured image based upon filtering results obtained by applying a filter within a color component other than the one color component.

According to the 7th aspect of the present invention, in the image processing apparatus according to the 3rd aspect, it is preferred that the discriminating unit alters the sharpness of at least one color component so that a difference between levels of definition of at least two color components including the color component in correspondence to which the sharpness is altered is greater than a difference between levels of definition of color components attributable to a chromatic aberration of the optical system.

According to the 8th aspect of the present invention, in the image processing apparatus according to the 3rd aspect, it is preferred that the image processing apparatus further comprises a color response characteristics correction unit that corrects the color response characteristics in correspondence to a level of initial saturation in the captured image before the sharpness is altered for the one color component.

According to the 9th aspect of the present invention, in the image processing apparatus according to the 3rd aspect, it is preferred that the image processing apparatus further comprises a color response characteristics correction unit that corrects the color response characteristics when a relationship between levels indicated by values assumed for the two color components relative to each other becomes inverted after the sharpness for the one color component is altered.

According to the 10th aspect of the present invention, in the image processing apparatus according to the 5th aspect, it is preferred that when a value assumed at the minimal point of the color response characteristics is greater than a predetermined value, the discriminating unit determines the color component in correspondence to which the sharpness has been altered is a color component originating in an image structure in the captured image.

According to the 11th aspect of the present invention, in the image processing apparatus according to any of the 1st through 10th aspects, it is preferred that the captured image is constituted with pixels each lacking color information corresponding to at least one color component.

According to the 12th aspect of the present invention, an image processing method, comprises: obtaining an image captured through an optical system; and discriminating a color component originating in an image structure in the captured image from a color component attributable to a chromatic aberration of the optical system.

According to the 13th aspect of the present invention, in the image processing method according to the 12th aspect, it is preferred that the color component attributable to the chromatic aberration of the optical system is corrected based upon discrimination results.

According to the 14th aspect of the present invention, in the image processing method according to the 12th or the 13th aspect, it is preferred that a sharpness is altered for at least one color component of the captured image and a color component originating in an image structure in the captured image is differentiated from the color component attributable to a chromatic aberration of the optical system based upon a difference in color response characteristics between at least two color components including the color component in correspondence to which the sharpness has been altered.

ADVANTAGEOUS EFFECT OF THE INVENTION

According to the present invention, a color component originating from an actual image structure in a captured image, i.e., a color that is actually present in the image structure can be differentiated (discriminated) from a color component attributable to a chromatic aberration of the optical system, such as color bleeding resulting from a longitudinal chromatic aberration, and by correcting the image based upon discrimination results, the image portion having become degraded due to the longitudinal chromatic aberration alone can be effectively corrected without adversely affecting the image structure.

BRIEF DESCRIPTION OF THE DRAWINGS

FIG. 7 A specific difference between image structures

FIG. 8 A specific example of a Bayer image

FIG. 9 A specific example of the smoothing filter used in the first embodiment

FIG. 10 A specific example of the smoothing filter applied to calculate Cr3*[i,j]

BEST MODE FOR CARRYING OUT THE INVENTION

First Embodiment

Figure 1:
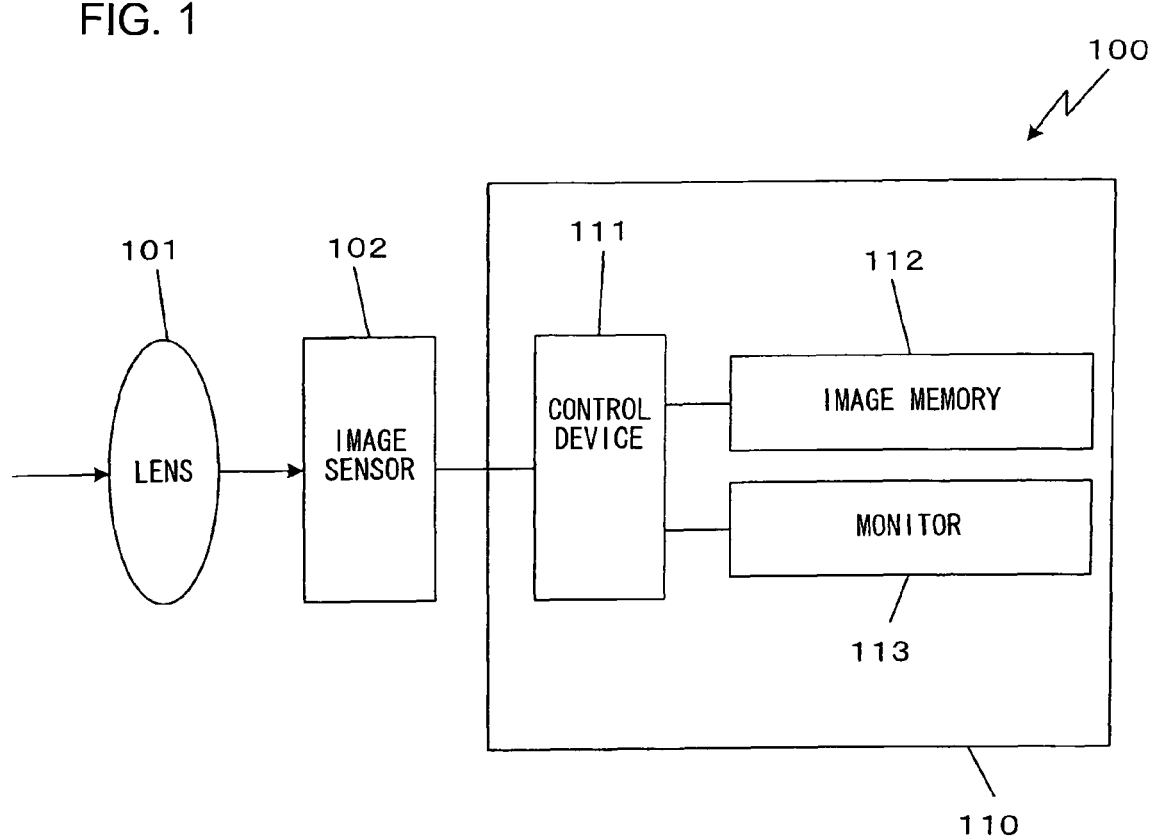
FIG. 1 A block diagram showing the structure adopted in an embodiment achieved by installing the image processing apparatus in a digital camera FIG. 2 A first set of diagrams illustrating the principal of color bleeding caused by a longitudinal chromatic aberration FIG. 3 A second set of diagrams illustrating the principal of color bleeding caused by a longitudinal chromatic aberration FIG. 4 A third set of diagrams illustrating the principal of color bleeding caused by a longitudinal chromatic aberration FIG. 5 A principal of longitudinal chromatic aberration correction for the R-component and the B-component, achieved by using another color component (G-component)

FIG. 1 is a block diagram showing the structure that may be adopted in an embodiment achieved by installing the image processing apparatus in the first embodiment in a digital camera. A digital camera 100 includes a lens 101, an image sensor 102 constituted of a CCD or the like and an image processing apparatus 110. The image sensor 102 may be a single-plate type color image sensor most typically equipped with R (red), G (green) and B (blue) color filters disposed in a Bayer array.

While the lens 101 is constituted with a plurality of optical lens groups, FIG. 1 shows a single lens for simpler representation. It is assumed that the image data for an image captured at the image sensor 102 via the lens 101 are expressed in the RGB calorimetric system and that color information corresponding to one of the color components R, G and B is present at each of the pixels constituting the image data. Namely, it is assumed that the image captured at the image sensor is a Bayer image.

The image processing apparatus 110 comprises a control device 111 that includes a CPU and peripheral circuits and executes image processing as detailed later, an image memory 112 in which an image captured at the image sensor 102 is stored and a monitor 113 at which the image having undergone the image processing is displayed. In this digital camera, the image data for the Bayer image captured at the image sensor 102 via the lens 101 are converted to digital signals through A/D conversion executed at the control device 111 and the digital signals resulting from the conversion are stored into the image memory 112.

Color bleeding induced by a longitudinal chromatic aberration (an axial chromatic aberration) may have occurred in the image data for the image captured at the image sensor 102 and stored in the image memory as described above. More specifically, in an image obtained by capturing an achromatic black-line subject, no blur signal is generated in correspondence to any of the color components R, G and B, as shown in FIG. 2(a), as long as the image is free of longitudinal chromatic aberration. However, if, for instance, a significant longitudinal chromatic aberration manifests in the R-component on the image formingplane, ablur signal occurs in correspondence to the R-component, as shown in FIG. 2(b) Namely, while sharply defined color component signals are generated in correspondence to the G-component and the B-component, a blurred color component signal is generated as the R-component signal.

If the phenomenon described above manifests at the sampling position shown in FIG. 3(a) in the Bayer array, the blur signal generated in correspondence to the R-component is applied to a black-line subject position where it becomes lifted and is then captured at an R pixel, resulting in red bleeding occurring around an edge of the black-line subject. If, on the other hand, the phenomenon manifests at the sampling Position shown in FIG. 3(b) in the Bayer array, the R-component signal with a signal intensity achieving contrast similar to those of the G-component and the B-component is detected at the R pixel and thus, the phenomenon does not have as much adverse effect as that in FIG. 3(a). This means that it may be extremely difficult to judge the state of image degradation in a Bayer image since the image degradation state may change from position to position depending upon how the Bayer sampling position is assumed in relation to a specific image structure.

While the image degradation state may be judged relatively easily for an image captured by an RGB three-plate type image sensor compared to a Bayer image, averaged color bleeding is observed over an edge area under circumstances such as those shown in FIG. 2(b). It is to be noted that if a significant longitudinal chromatic aberration manifests in correspondence to the B-component, blue bleeding occurs, whereas if a significant longitudinal chromatic aberration manifests in correspondence to both the R-component and the B-component, magenta bleeding occurs. Depending upon the subject distance, a single image may contain different types of color bleeding, e.g., blue bleeding or magenta bleeding occurring in the background and red bleeding occurring in the foreground.

Figure 4:
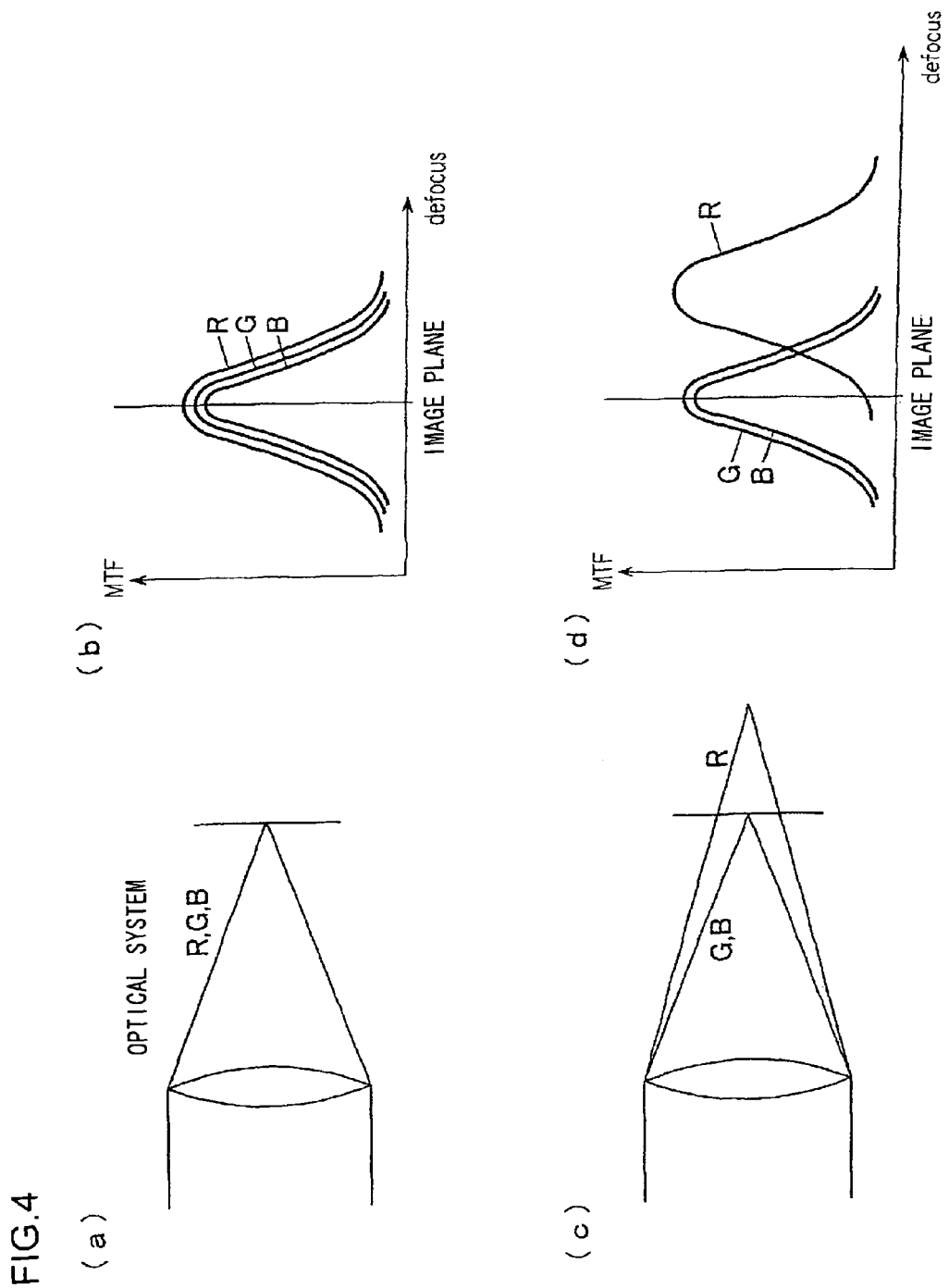

The principal of color bleeding attributable to the longitudinal chromatic aberration described above, which may occur when an image of an achromatic black-line subject is captured, is now explained. When an image of an achromatic black-line subject is captured through the optical system with no longitudinal chromatic aberration, the focal points corresponding to the R, G and B-components are all aligned on the imaging plane, as shown in FIG. 4(a). Namely, the MTF characteristics of the R, G and B-components all match, as shown in FIG. 4(b). If, on the other hand, a longitudinal chromatic aberration manifests in correspondence to the R-component, the focal point corresponding to the R-component. is offset from the imaging plane as shown in FIG. 4(c) and the MTF characteristics fail to match up on the imaging plane, as shown in FIG. 4(d).

In the first embodiment, the control device 111 eliminates color bleeding induced by a longitudinal chromatic aberration occurring in correspondence to one of the color components R, G and B by correcting the MTF characteristics mismatch among the individual color components. Namely, it digitally achieves an effect of eliminating the longitudinal chromatic aberration from the image by matching up the MTF characteristics of the various color components or setting their MTF characteristics as close as possible to one another. More specifically, the color bleeding attributable to the longitudinal chromatic aberration is eliminated based upon the following principle.

Figure 5:
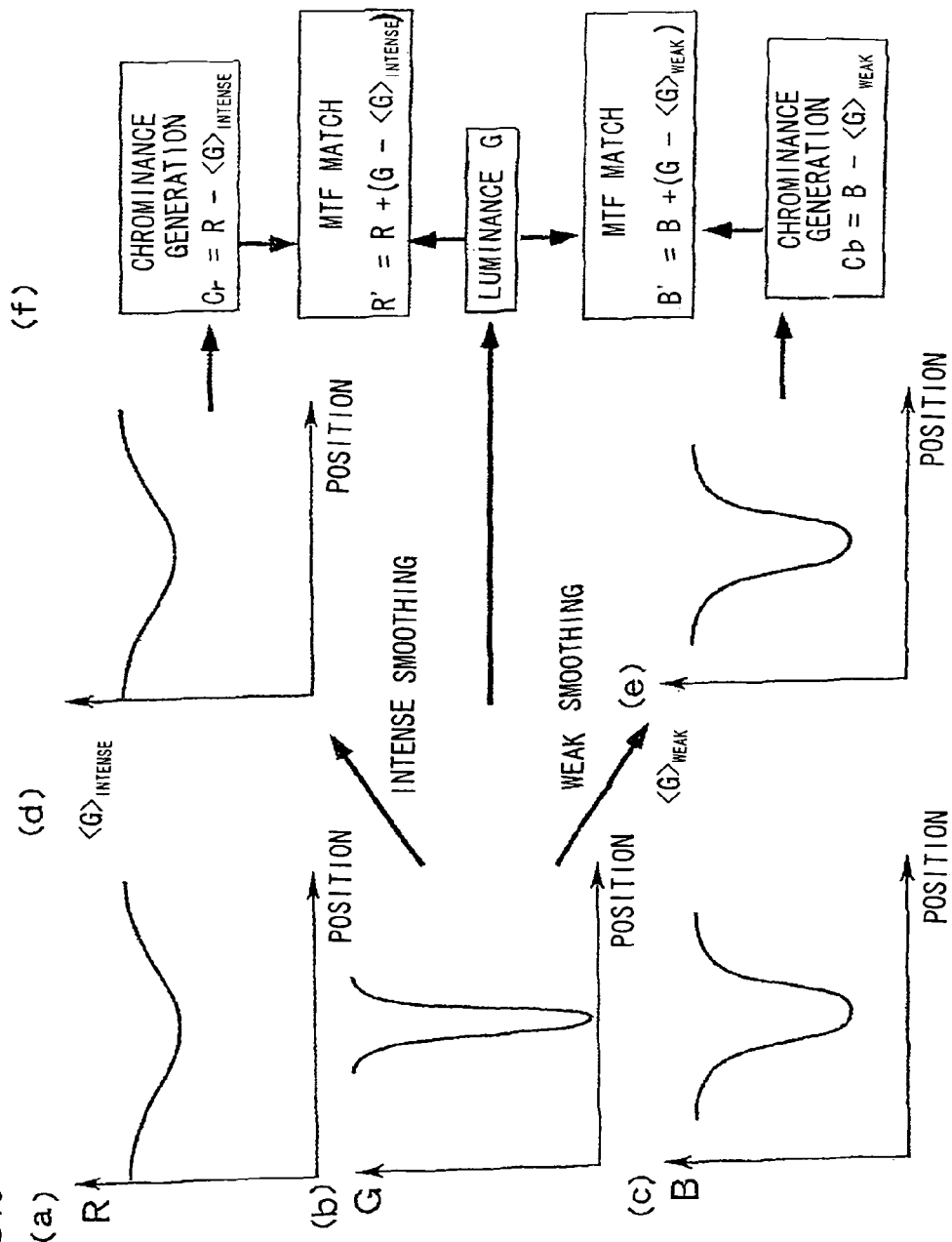

For instance, when the levels of the R, G and B-component signals constituting the image are as shown in FIGS. 5(a) through 5(c), the MTF characteristics of the blurred color component signals, i.e., the R-component and B-component signals, are corrected to achieve an MTF match by sharpening with the MTF characteristics of the sharply defined color component signal, i.e., theG-component signal. Accordingly, the sharply defined color component signal is first designated as a reference color component and the reference color component is smoothed so as to set the reference color component MTF characteristics closer to the MTF characteristics of the blurred color component signals or to exactly match the reference color component MTF characteristics with the MTF characteristics of the blurred color component signals. Namely, in the example presented in FIG. 5, the G-component is smoothed so as to set the MTF characteristics closer to the MTF characteristics of the R-component and the MTF characteristics of the B-component.

As a result, $<G>_{intense}$ generated by smoothing the G-component to a great extent so as to set the MTF characteristics of the G-component close to the MTF characteristics of the R-component, as shown in FIG. 5(d), and $<G>_{weak}$ generated by smoothing the G-component to a smaller extent so as to set the MTF characteristics of the G-component close to the MTF characteristics of the B-component as shown in FIG. 5(e) are obtained. Then, as shown in FIG. 5(f), chrominance (color difference) components Cr and Cb are generated based upon the G-component signal generated by smoothing the G-component signal in correspondence to the R-component and the B-component, i.e., $<G>_{intense}$ and $<G>_{weak}$.

Subsequently, the MTF characteristics of the R-component and the B-component can be adjusted so as to match or approximate the MTF characteristics of the G-component by converting the data back to the RGB colorimetric system based upon the chrominance components Cr and Cb and the initial unsmoothed G-component, thereby achieving the MTF match. In other words, the MTF characteristics of the R-component and the B-component can be adjusted to match the MTF characteristics of the sharply defined G-component by adding the difference between the initial G-component and $<G>_{intense}$ generated by smoothing the initial G-component to a given smoothing extent and the difference between the initial G-component and $<G>_{weak}$ generated by smoothing the initial G-component to another smoothing extent, respectively to the R-component and the B-component.

Namely, by correcting the R-component as expressed in (1) below and correcting the B-component as expressed in (2) below, the longitudinal chromatic aberration having occurred in correspondence to the R-component and the B-component is corrected based upon another component (G-component) achieving highly defined MTF characteristics.

$$R'=R+(G-<G>_{intense}) \quad (1)$$

$$B'=B+(G-<G>_{weak}) \quad (2)$$

As described above, high-frequency component contrast information, which cannot be recovered from a color component signal with a low level of MTF characteristics alone, is reproduced by using another color component achieving a high level of MTF characteristics so as to realize high definition longitudinal chromatic aberration correction. While a significant correction effect is achieved in conjunction with an image captured through a three-plate type image sensor at which the R, G and B signals are all sampled with equal sampling frequencies, an even more prominent correction effect is achieved in conjunction with a Bayer image constituted with R, G and B signals sampled at various sampling frequencies.

Next, the method adopted when determining the smoothing quantities (the gradation quantities) that need to be set in expressions (1) and (2) to assure an optimal MTF-characteristics match is explained. While the publication of the related art (Japanese Laid Open Patent Publication No. 2001-103358) states that the smoothing quantities should be determined by checking the "correlation", the document does not include any specific definition of the term "correlation" and it is not clear as to whether or not accurate correlation can be determined. According to the present invention, the graduation quantities are each determined based upon a chrominance saturation response (color response) of the color component relative to the smoothing quantity used as an index.

As described earlier in reference to FIG. 5, as the MTF characteristics are matched, the image structures in the different color components gradually become similar, resulting in a lower level of saturation corresponding to the color bleeding. If the smoothing is continuously applied, the image structures start to become less similar and the image structures presumably start to take on undesirable hues. Accordingly, it is essential that the MTF match be attempted at the smoothing quantity at which the lowest possible level of saturation is achieved. This point is explained in further detail in reference to FIGS. 6 and 7.

Figure 6:
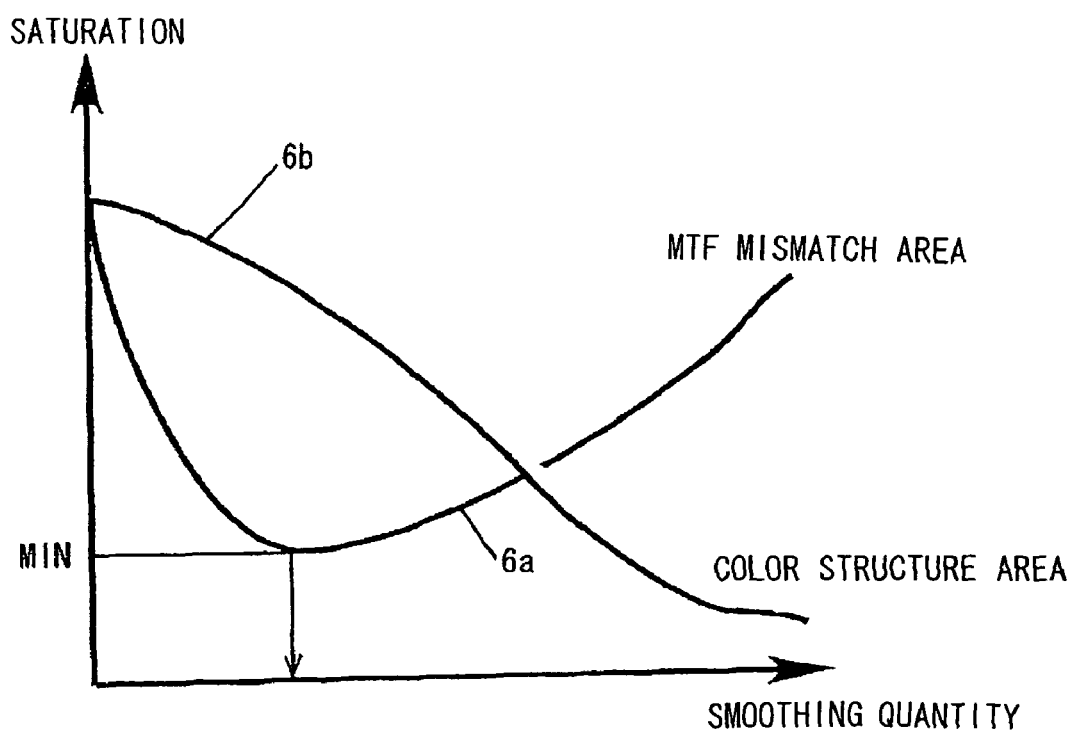
FIG. 6 A specific example of the relationship between saturation and smoothing

Among sets of color response characteristics in which the saturation level changes in response to the smoothing quantity, color response characteristics 6a in FIG. 6 are the characteristics with which MTF match can be achieved at the smoothing quantity that provides the lowest possible saturation level, as explained above. While the smoothing quantity determined based upon these color response characteristics 6a indicates the correct extent of smoothing as long as the subject image structure is present over an achromatic image area, as shown in FIG. 7(a), the smoothing quantity does not indicate the correct smoothing extent if the image structure contains a boundary of red and white color areas (the boundary between the white color and the red color in an image area with a red line drawn against a white background), as shown in FIG. 7(b). In a case such as that shown in FIG. 7(b), the Cr saturation level becomes lower as further smoothing is applied to the G-component as indicated by color response characteristics 6b and thus, the image structure may become greatly disrupted as a result of a longitudinal chromatic aberration correction executed with the smoothing quantity providing the lowest possible saturation level.

Accordingly, the change occurring in the color response as a result of smoothing application to the reference color component at a greater smoothing quantity than the smoothing quantity substantially matching the extent of smoothing required for MTF match is checked to determine whether the subject image area is an area where the image has become degraded due to a longitudinal chromatic aberration or an initial image color structure area in the embodiment. Namely, the color response to a large smoothing application is tested to differentiate causes of coloration in the image.

More specifically, if the color response characteristics observed by applying smoothing to the G-component by a great extent are represented by a function with a minimal point, as indicated by the color response characteristics 6a, the subject image area is judged to be a degraded image area that has become degraded due to a longitudinal chromatic aberration. If, on the other hand, the color response characteristics resulting from smoothing application to the G-component by a great extent are represented by a monotonically decreasing function, as indicated by the color response characteristics 6b, the subject image area is judged to be a color structure portion included in the initial image. As a result, the longitudinal chromatic aberration can be corrected effectively while very unlikely destroying the image structure,.

The following is an explanation of the specific processing executed to eliminate color bleeding attributable to the longitudinal chromatic aberration by differentiating image structures and correcting the mismatch in the MTF characteristics corresponding to the individual color components.

(1-1) Bayer Image Input

First, the Bayer image captured at the image sensor 102 is read from the image memory 112 and is designated as an image processing target. It is to be noted that color information corresponding to one of the color components R, G and B, i.e., a color component value (a value corresponding to a CCD signal value), is present at each pixel [i,j] among the pixels constituting the Bayer image. [i,j] denotes a set of coordinates indicating a specific pixel position.

(1-2) Directional Judgment

Directional similarity at an R/B pixel position is determined by using the Bayer image through processing similar to the interpolation processing in the related art. It is to be noted that while the directional judgment is made by adopting a standard method in the known art in the first embodiment, the directional judgment may be executed through an alternative method in the known art.

(1-2-1) Similarity Factor Calculation

A vertical direction similarity factor Cv[i,j] and a horizontal-direction similarity factor Ch[i,j] are calculated for an R position or a B position, as indicated in (3) and (4) below.

$$Cv[i,j]=\{(|G[i,j-1]-Z[i,j]|+|G[i,j+1]-Z[i,j]|)/2+|G[i,j-1]-G[i,j+1]|\}/2 \quad (3)$$

$$Ch[i,j]=\{(|G[i-1,j]-Z[i,j]|+|G[i+1,j]-Z[i,j]|)/2+|G[i-1,j]-G[i+1,j]|\}/2 \quad (4)$$

It is to be noted that Z in expressions (3) and (4) represents R or B.

(1-2-2) Similarity Judgment

Next, the similarity factors are converted to a directional index by comparing the similarity factors as indicated in the following conditional expression (5).

If $|Cv[i,j]-Ch[i,j]| \leq Th1$ THEN $HV[i,j]=0 \rightarrow$ direction of similarity (vertical or horizontal) not clear else
if $Cv[i,j]<Ch[i,j]$ THEN $HV[i,j]=1 \rightarrow$ vertical similarity else $HV[i,j]=-1 \rightarrow$ horizontal similarity  (5)

It is to be noted that the threshold value Th1 should assume a value equal to or close to 10 in correspondence to 256 gradations but should assume a higher value if the image contains a great deal of noise.

(1-3) MTF Modulated Bayer Image Generation

In order to achieve MTF match for the R, G and B color components, a plurality of smoothed images are generated in correspondence to each color component. However, the G-component pixels, which indicate the luminance (brightness), are disposed at higher density in the Bayer array in the embodiment and, accordingly, the MTF corresponding to the R-component and the B-component is assumed to be inferior in the first place since they are sampled with lower frequency in the Bayer array. For this reason, the plurality of types of smoothed images must be created only in correspondence to the G-component. Namely, the G-component is designated as the reference color component and the level of sharpness of the G-component is altered.

In the embodiment, a weak smoothing filter ($\diamondsuit_{3\times3}$) shown in FIG. 9(a), an intense smoothing filter ($\diamondsuit_{5\times5}$) indicated in FIG. 9(b) and a large smoothing filter ($\diamondsuit_{65\times65}$) to be used for color structure differentiation as expressed in (6) are used to generate three types of smoothed image in correspondence to the G-component. As a result, four G planes including an unsmoothed image ($\diamondsuit_{1\times1}$), i.e., $<G>_{1\times1}$, $<G>_{3\times3}$, $<G>_{5\times5}$, and $<G>_{65\times65}$, are obtained.

[Expression 1]

$$\langle \ \rangle_{65\times65} = \langle \ \rangle_{5\times5} \otimes \langle \ \rangle_{5\times5} \otimes \langle \ \rangle_{5\times5}$$
$$\otimes \langle \ \rangle_{5\times5} \otimes \langle \ \rangle_{5\times5} \otimes \langle \ \rangle_{5\times5} \otimes \langle \ \rangle_{5\times5}$$
$$\otimes \langle \ \rangle_{5\times5} \quad (6)$$

$\diamondsuit_{65\times65}$, which is a large smoothing filter used for color structure differentiation, is defined so that the difference between the sharpness of the G-component and the sharpness of the R-component resulting from the occurrence of a standard longitudinal chromatic aberration is not as great as the difference between the sharpness of the G-component and the sharpness of the R-component determined after applying smoothing to the G-component by using the $\diamondsuit_{65\times65}$ filter.

It is to be noted that the $\diamondsuit_{5\times5}$ filter shown in FIG. 9(b) is repeatedly applied eight times to calculate $<G>_{65\times65}$ in expression (6). Namely, the eight applications of the $\diamondsuit_{5\times5}$ filter are equivalent to a single application of the $\diamondsuit_{65\times65}$ filter. It is to be noted that while an explanation is given in reference to the embodiment on an example in which three different filters, $<G>_{3\times3}$, $<G>_{5\times5}$, and $<G>_{65\times65}$, are used, additional filters defining filtering ranges between these three filters may also be used.

(1-4) Virtual Chrominance Plane Generation

The four types of G planes $<G>_{1\times1}$, $<G>_{3\times3}$, $<G>_{5\times5}$, and $<G>_{65\times65}$ obtained as described in (1-3) are used in interpolation for an R position pixel in the Bayer plane and then, four types of Cr components (chrominance components) are generated in correspondence to the R position. Expressions (7)~(10) below schematically express Cr0, Cr1, Cr2 and Cr3, each representing one of the four Cr components generated in correspondence to the R position.

$$Cr0[i,j]=R[i,j]-<G[i,j]>_{1\times 1} \quad (7)$$

$$Cr1[i,j]=R[i,j]-<G[i,j]>_{3\times 3} \quad (8)$$

$$Cr2[i,j]=R[i,j]-<G[i,j]>_{5\times 5} \quad (9)$$

$$Cr3[i,j]=R[i,j]-<G[i,j]>_{65\times 65} \quad (10)$$

The generation of the Cr0 plane is now explained. The Cr0 plane is generated for the R position, as expressed in (11) below. The other planes Cr1, Cr2 and Cr3, too, can be generated in a similar manner. It is to be noted that the Cr planes are generated only in correspondence to R-pixel positions in the Bayer array and the interpolation processing is not executed in correspondence to other positions.

$$\text{If } HV[i,j]=1 \text{ THEN } Cr0[i,j]=R[i,j]-(G[i,j-1]+G[i,j+1])/2 \text{ else if } HV[i,j]=-1 \text{ THEN } Cr0[i,j]=R[i,j]-(G[i-1,j]+G[i+1,j])/2 \text{ else } Cr0[i,j]=R[i,j]-(G[i,j-1]+G[i,j+1]+G[i-1,j]+G[i+1,j])/4 \quad (11)$$

Through processing similar to the Cr plane generation processing explained above, four types of Cb components (Cb0, Cb1, Cb2 and Cb3) are generated in correspondence to the B-pixel position. It is to be noted that while the following explanation is abridged by focusing on the processing executed on the Cr planes, processing similar to that executed on the Cr planes should be executed on the Cb planes, as well.

(1-5) Color Index Generation

Next, color indices Cdiff, to be used to compare color changes in images that may be generated in correspondence to the four different levels of smoothing application with one another are generated. In this example, the color indices each directly represent the chrominance saturation change. While the processing executed to determine the smoothing quantity required to achieve an optimal MTF match for the R-component and the G-component by using the Cr planes generated as described in (1-4) is explained below, the smoothing quantity needed for an optimal MTF match for the B-component and the G-component, too, can be determined in a similar manner by using the Cb planes.

The color indices each corresponding to one of the four chrominance components are generated for the R-pixel position as expressed in (12) through (15). It is to be noted that Cdiff0, Cdiff1, Cdiff2 and Cdiff3 in expressions (12) through (15) respectively represent the color index corresponding to Cr0, the color index corresponding to Cr1, the color index Corresponding to Cr2 and the color index corresponding to Cr3.

$$Cdiff0[i,j]=|Cr0[i,j]| \quad (12)$$

$$Cdiff1[i,j]=|Cr1[i,j]|+\alpha 1 \quad (13)$$

$$Cdiff2[i,j]=|Cr2[i,j]|+\alpha 2 \quad (14)$$

$$Cdiff3[i,j]=|Cr3*[i,j]|+\alpha 3-\beta 3* \quad (15)$$

It is to be noted that $\alpha 1$, $\alpha 2$, $\alpha 3$ and $\beta 3$ in expressions (13) through (15) each represent a correction term used to improve the destruction-resistance characteristics of the image structure and that * in expression (15) indicates correction processing executed on the Cr3 plane by using a low pass filter. While the present invention may be adopted without using these correction terms or executing the correction processing in expressions (13) through (15), the embodiment is described in reference to an example in which the correction terms are used so as to improve the destruction-resistance characteristics of the image structure. The correction terms $\alpha 1$, $\alpha 2$, $\alpha 3$ and $\beta 3$ are respectively calculated as expressed in (16) through (19) below.

$$\text{If sign}(Cr1[i,j])*\text{sign}(Cr0[i,j])=-1 \text{ then } c\alpha 1=|Cr1[i,j]-Cr0[i,j]| \text{ else } \alpha 1=0 \quad (16)$$

$$\text{If sign}(Cr2[i,j])*\text{sign}(Cr0[i,j])=-1 \text{ then } \alpha 2=|Cr2[i,j]-Cr0[i,j]| \text{ else } \alpha 2=0 \quad (17)$$

$$\text{If sign}(Cr3[i,j])*\text{sign}(Cr0[i,j])=-1 \text{ then } \alpha 3=|Cr3[i,j]-Cr0[i,j]| \text{ else } \alpha 3=0 \quad (18)$$

$$\text{If } 0=<Cdiff0[i,j]<S1 \text{ then } \beta 3=Th1 \text{ Else if } S1=<Cdiff0[i,j]<S2 \text{ then } \beta 3=Th1+(Cdiff[i,j]-S1)*(Th2-Th1)/(S2-S1) \text{ Else if } S2=<Cdiff0[i,j] \text{ then } \beta 3=Th2 \quad (19)$$

As explained above, the correction terms $\alpha$ and $\beta$ are used as means for improving the image structure destruction-resistance characteristics and the low pass processing executed on the Cr3 plane constitutes a means for ensuring that the MTF mismatch is corrected with a high degree of reliability for the smoothed image generated by using the large smoothing filter. Namely, since color bleeding tends to spread over a wide range in an image generated through large-scale smoothing, the low pass processing is executed on the Cr3 plane by collecting the color bleeding so as to prevent fluctuations occurring in units of individual pixels and to ensure that the saturation level increases in a stable manner as indicated by the color response characteristics 6a in FIG. 6.

When the sign of a chrominance component changes (if the phase changes) following smoothing processing, i.e., if the relationship between the levels of the two color components becomes reversed after the smoothing processing, it is more likely to be the result of a change in the hue in an image structure rather than the results of the saturation over an MTF mismatch area simply having become lowered. The correction terms $\alpha$ are each used to add restrictions for the corresponding saturation index so as to allow Cr0 to be selected more readily under such circumstances.

The correction term $\beta$ is used to purposefully create An environment in which the saturation monotonically decreases, as indicated by the color response characteristics 6b in FIG. 6 over an area that is judged to be an image structure, without affecting the saturation increase in an MTF mismatch area, since the saturation in a color structure area is not necessarily guaranteed to keep decreasing, depending upon the image structure therein, while the saturation starts to increase with a high level of reliability over an MTF mismatch area as a result of large-scale smoothing processing. Namely, when the initial saturation level, prior to the smoothing processing, is higher, the image area is more likely to be a color structure area, which is more likely to be adversely affected in the event of misjudgment, and accordingly, $\beta 3$ assumes a higher value when the initial saturation level is higher so as to assure a desirable level of destruction-resistance characteristics for the image structure.

In accordance, S1, S2, Th1 and Th2 in expression (19) assume values of, for instance, S1=10~12 and S2=30~50 for the initial saturation level and Th1 and Th2 assume values such as Th1=0~5 and Th2=10~20 in correspondence when there are 256 gradations. It is to be noted that Cr3* [i,j] is calculated as expressed in (15) by applying a filter such as a filter 10a to Cr3, as shown in FIG. 10.

(1-6) Determining the Smoothing Quantity

The four color indices calculated as expressed in (12)~(15) for the G-component smoothing are then compared with one another, as expressed in (20) and (21) below, so as to select the chrominance component Cr to be set for the R-pixel position.

Namely, the smallest (minimal) color index among Cdiff0~Cdiff3 is extracted as Cdiff_min, as expressed in (20). A decision is then made based upon conditional expression (21) with regard to the extracted Cdiff_min and the chrominance component Cr to be set at the R-pixel position is selected.

$$Cdiff\_min[i,j]=MIN\{Cdiff0[i,j],Cdiff1[i,j],Cdiff2[i,j],Cdiff3[i,j]\} \quad (20)$$

If Cdiff_min[i,j]>=ThS then Cr[i,j]=Cr0[i,j]else if
  Cdiff_min[i,j]=Cdiff0[i,j] then Cr[i,j]=Cr0[i,j]
  else if Cdiff_min[i,j]=Cdiff1[i,j] then Cr[i,j]=Cr1
  [i,j]else if Cdiff_min[i,j]=Cdiff2[i,j] then Cr[i,j]
  =Cr2[i,j]else if Cdiff_min[i,j]=Cdiff3[i,j] then
  Cr[i,j]=Cr0[i,j]     (21)

When the smallest color index Cdiff_min is equal to or greater than a predetermined threshold value Ths in expression (21), the lowest ultimate saturation level is still high. In this situation, the color bleeding having occurred in the Bayer image is more likely to represent a colored area in a very colorful image structure than light color bleeding attributable to a longitudinal chromatic aberration and accordingly, the color bleeding is not corrected. If, on the other hand, Cdiff_min is equal to Cdiff3, the saturation assumes the lowest level following the large-scale smoothing. In other words, the color response characteristics can be expressed in a monotonically decreasing function whereby the saturation level keeps decreasing relative to the smoothing quantity, as indicated by the color response characteristics 6b in FIG. 6. Accordingly, no correction is executed in this situation either. Otherwise, the color response characteristics are invariably expressed by a function with a minimal point, e.g., the color response characteristics 6a in FIG. 6, and accordingly, the chrominance component Cr is set by using for substitution a chrominance plane having been corrected based upon the smoothing quantity providing the minimal value for the saturation level.

Next, erroneous correction prevention processing is executed to make a decision as to whether or not the chrominance component having been set assumes a value that appears to be unnatural considering the initial chrominance component value. This decision may be made by double checking the sign preceding the chrominance component value, since color indices are determined based upon the absolute values representing the chrominance. In reference to the embodiment, processing executed by first obtaining a luminance plane (G plane) generated independently of the chrominance planes, and then referencing this luminance plane is explained. More specifically, the decision is made as expressed in (22) below.

If $(\text{sign}(Cr) * \text{sign}(Cr0) = -1)$ then {     (22)

If $G[i, j] > ThL$ then $Cr[i, j] = Cr0[i, j]$

Else $Cr[i,j] = 0$

}

If the phase of the chrominance component becomes inversed and the luminance level is higher than a predetermined threshold value ThL, the chrominance Cr at the R-pixel position is reset to the initial Cr0 in expression (22). Thus, more rigorous restrictions are applied when the phase is inversed over a bright and high-contrast area so as to recover the initial state. In contrast, when the phase of the chrominance component is inversed but the luminance is low, zero is set in order to sustain the hue. Through the processing described above, Cr having undergone the longitudinal chromatic aberration correction is generated for the R-pixel position. Through similar processing, Cb having undergone the longitudinal chromatic aberration correction is generated for the B-pixel position as well.

(1-7) Corrected Chrominance Plane Generation

Based upon Cr, having undergone the longitudinal chromatic aberration correction, which is generated for the R-pixel position as described above, the Cr plane for the B Position and the G position is calculated through interpolation, as expressed in (23) through (25) below. It is to be noted that while expressions (23)~(25) represent Cr plane interpolation at the B position and the G position, similar processing is executed to calculate values representing the Cb plane at the R position and the G position through interpolation.

Cr plane interpolation for B position $$Cr[i,j]=(Cr[i-1,j-1]+Cr[i-1,j+1]+Cr[i+1,j-1]+Cr[i+1,j+1])/4 \quad (23)$$

Cr plane interpolation for G position (same lines as R rows)

$$Cr[i,j]=(Cr[i-1,j]+Cr[i+1,j])/2 \quad (24)$$

Cr plane interpolation for G position (same lines as B rows)

$$Cr[i,j]=(Cr[i,j-1]+Cr[i,j+1])/2 \quad (25)$$

(1-8) Luminance Plane Generation

The luminance plane is generated by using the initial pre-smoothing Bayer signals. While an explanation is given in reference to the embodiment on an example in which the luminance plane is generated through a standard well-known method as expressed in (26) below, the luminance plane may be generated by adopting another superior method. R/B position on Bayer plane If HV[i,j]=1 THEN Gout[i,j]=(G[i,j-1]+G[i,j+1])/2 +
  (2×Z[i,j]-Z[i,j-2]-Z[i,j+2])/4 else if HV[i,j]=-1
  THEN Gout[i,j]=(G[i-1,j]+G[i+1,j])/2 +(2×Z[i,
  j]-Z[i-2,j]-Z[i+2,j])/4 else Gout[i,j]=(G[i,j-1]+
  G[i,j+1]+G[i-1,j]+G[i+1,j])/4 +(4×Z[i,j]-Z[i,j-
  2]-Z[i,j+2]-Z[i-2,j]-Z[i+2,j])/8     (26)

It is to be noted that Z=R at the R position but Z=B at the B position in expression (26). In addition, the G position Gout [i,j] assumed on the Bayer plane can be Determined by directly using the Bayer signal for substitution. By generating the luminance plane, which is not greatly affected by the longitudinal chromatic aberration, based upon the initial Bayer signals, the luminance plane can be reproduced with the initial sharp resolution.

(1-9) Colorimetric System Conversion

The data obtained through the processing are then converted to the RGB calorimetric system as expressed in (27) and (28) below based upon the three types of color information, i.e., the Cr plane and the Cb plane free of the longitudinal chromatic aberration and the G plane retaining sharp definition.

$$Rout[i,j]=Cr[i,j]+Gout[i,j] \quad (27)$$

$$Bout[i,j]=Cb[i,j]+Gout[i,j] \quad (28)$$

Through the processing described above, any color bleeding attributable to a longitudinal chromatic aberration occurring in correspondence to a color component among the R, G and B color components in a Bayer image having been read can be eliminated by correcting the MTF characteristics mismatch among the individual color components. The RGB image, now free of color bleeding attributable to longitudinal chromatic aberration, is then output to and displayed at the monitor 113.

Figure 11:
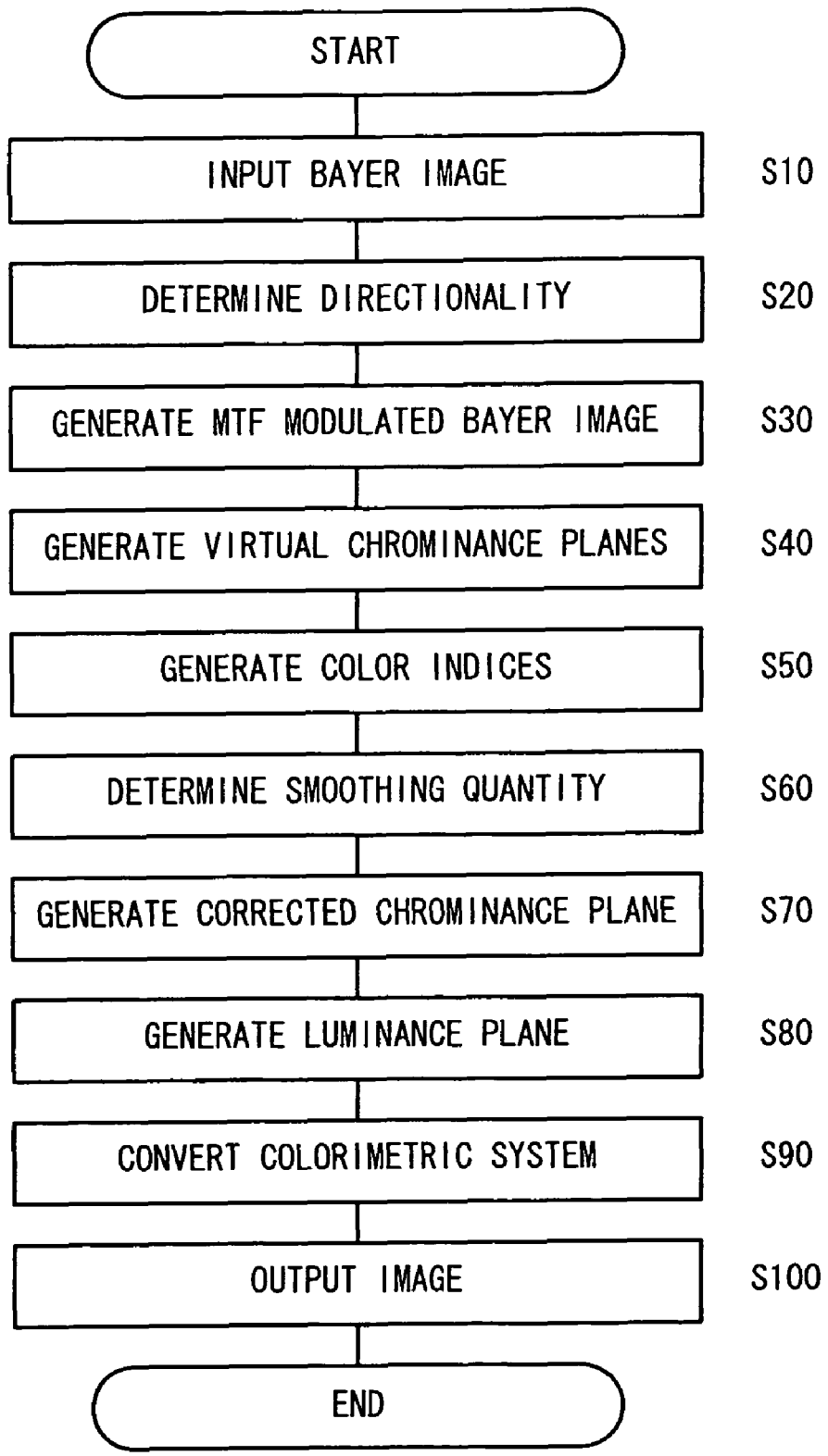
FIG. 11 A flowchart of the operation executed in the image processing apparatus 110 in the first embodiment FIG. 12 An illustration showing how the program may be provided to a personal computer via a recording medium such as a CD or an electric communication network such as the Internet

FIG. 11 presents a flowchart of the operation executed by the image processing apparatus 110 in the first embodiment. The processing shown in FIG. 11 is executed by the control device 111 in conformance to a program started up as an image captured at the image sensor 102 through the lens 101 is stored into the image memory 112.

In step S10, the Bayer image having been captured by the image sensor 102 is read from the image memory 112 as explained in (1-1) and then the operation proceeds to step S20. In step S20, a decision is made with regard to the directionality at the R/B pixel position by using the Bayer image, as explained in (1-2). Subsequently, the operation proceeds to step S30.

In step S30, the MTF modulated Bayer image generation processing is executed as described in (1-3) and then the operation proceeds to step S40. In step S40, the virtual chrominance plane generation processing is executed as described earlier in (1-4), before the operation proceeds to step S50. In step S50, the color index generation processing is executed as described in (1-5), and then the operation proceeds to step S60. In step S60, processing is executed to determine the optimal smoothing quantity as described in (1-6), before the operation proceeds to step S70.

In step S70, the corrected chrominance plane generation processing described in detail in (1-7) is executed and then the operation proceeds to step S80 to execute the luminance plane generation processing as described in (1-8). Subsequently, the operation proceeds to step S90 to execute the calorimetric system conversion processing as described in (1-9), thereby converting the data to the RGB calorimetric system by using the three types of color information, i.e., the Cr plane and the Cb plane free of the longitudinal chromatic aberration and the G plane retaining the sharp definition. Then, the operation proceeds to step S100 to output the image free of the color bleeding attributable to the longitudinal chromatic aberration to the monitor 113 before the processing ends.

The following advantages are achieved in the first embodiment described above.

(1) Based upon the change occurring in the color response as a result of applying smoothing to the color reference component by an extent greater than the smoothing quantity needed to achieve MTF match, a degraded image area where the image has become degraded due to a longitudinal chromatic aberration is differentiated from a color structure portion in the initial image. Thus, any degraded image area where the image has become degraded due to a longitudinal chromatic aberration can be determined with a high level of accuracy.

(2) After identifying the subject image area as a degraded image area where the image has become degraded due to the longitudinal chromatic aberration or a color structure portion in the initial image, correction is executed only if the image in the subject image area has been degraded due to the longitudinal chromatic aberration. As a result, longitudinal chromatic aberration correction assuring a very high level of image structure destruction-resistance characteristics is enabled.

(3) When generating color indices, the correction terms α and β are incorporated so as to improve the image structure destruction-resistance characteristics. Thus, in relation to large-scale smoothing response, only an MTF mismatch area is selectively corrected with a high level of reliability.

(4) When determining the optimal smoothing quantity, the chrominance component Cr is directly used without correction if the smallest color index Cdiff_min is equal to or greater than the predetermined threshold value Ths. When Cdiff_min is equal to or greater than the predetermined threshold value Ths, the lowest ultimate saturation level is still high and, accordingly, an accurate judgment that no correction is necessary can be made by taking into consideration that the color signal captured in the Bayer image is more likely to represent a very colorful image portion rather than pale color bleeding attributable to a longitudinal chromatic aberration.

(5) When Cdiff_min is equal to Cdiff3, the chrominance component Cr is not corrected. When Cdiff_min is equal to Cdiff3, the saturation assumes the lowest level as a result of the large-scale smoothing and, accordingly, an accurate judgment that no correction is required can be made by taking into consideration that the saturation keeps decreasing relative to the smoothing quantity, as indicated by the color response characteristics 6b shown in FIG. 6.

Second Embodiment

In reference to the first embodiment, the longitudinal chromatic aberration correction executed for image data yet to undergo interpolation, such as a Bayer image captured with a single-plate type color image sensor, has been explained. In reference to the second embodiment, longitudinal chromatic aberration correction executed for data expressing a color image photographed with a three-plate type color image sensor, i.e., a color image constituted with pixels, each holding information corresponding to all the color components R, G and B, is explained.

It is to be noted that FIGS. 1 through 7, 9 and 10, in reference to which the first embodiment has been described, also apply to the second embodiment and accordingly, the aspects of the second embodiment shown in these figures are not explained. However, the image sensor 102 in the block diagram presented in FIG. 1 is constituted with a three-plate type color image sensor instead of a single-plate type color image sensor so as to obtain a color image with the pixels each holding color information corresponding to the R, G and B-components.

The longitudinal chromatic aberration correction processing executed for an image captured through the single-plate type image sensor, as explained in reference to the first embodiment, may be schematically expressed as in (29) through (31) below.

$$R' = R + (G - \langle G \rangle_{m \times m}) \quad (29)$$

$$G' = G \quad (30)$$

$$B' = B + (G - \langle G \rangle_{n \times n}) \quad (31)$$

Namely, in the first embodiment, filter processing is executed with a filter such as $\langle G \rangle_{m \times m}$ or $\langle G \rangle_{n \times n}$ applied in correspondence to a color component (G-component) other than, at least, the R-component or the B-component, so as to adjust the sharpness of at least one color component in the captured image. During this process, the smoothing range m×m or n×n is adjusted up to the large-scale smoothing range to determine the color response between R' and G' or between B' and G' and thus, the smoothing quantity required to achieve the optimal longitudinal chromatic aberration correction is determined by differentiating a degraded image area and an image structure portion from each other.

A similar principle may apply in conjunction with an image captured through a three-plate type imaging system. For instance, assuming that the best MTF characteristics are achieved with the G-component, the MTF characteristics corresponding to the R-component and the B-component may be adjusted to achieve sharper definition to match the MTF characteristics of the G-component through correction executed by using high-frequency information corresponding to the other color component, as in the case of the image constituted with pixels in a Bayer array as expressed in (29)~(31).

Alternatively, as expressed in (32) (34) below, sharper definition may be achieved through edge emphasis based upon the information present within the corresponding color plane alone. Namely, filter processing may be executed with a smoothing filter such as $<R>_{m \times m}$ or $<B>_{n \times n}$ within at least one of the color components R or B so as to adjust the sharpness of at least one color component in the captured image through unsharp mask processing.

$$R'=R+(R-<R>_{m \times m}) \quad (32)$$

$$G'=G \quad (33)$$

$$B'=B+(B-<B>_{n \times n}) \quad (34)$$

When executing the correction as expressed in (32)~(34), the smoothing quantity $<R>_{m \times m}$ and the smoothing quantity $<B>_{n \times n}$ are adjusted to the large-scale smoothing quantity and the color response between R' and G' and between B' and G' is ascertained as expressed in (12)~(22) to distinguish a degraded image area from an image structure portion as in the first embodiment.

In addition to the advantages of the first embodiment, the second embodiment described above achieves an advantage in that longitudinal chromatic aberration correction assuring a very high level of image structure destruction-resistance characteristics can be executed for an image captured with a three-plate type color image sensor.

Examples of Variations

It is to be noted that the image processing apparatuses achieved in the embodiments as described above allow for the following variations.

(1) As indicated in expressions (12)~(15), the color indices Cdiff are evaluated individually for |Cr| and |Cb| in the first embodiment. However, the present invention is not limited to this example and interpolation values may be generated individually for the B-pixel position and the R-pixel position, the following expression (32) maybe defined for the R/B pixel and a G smoothing quantity corresponding to Cr and a G smoothing quantity corresponding to Cb may be two-dimensionally determined instead.

$$Cdiff[i,j]=(|Cr[i,j]|+|Cb[i,j]|+|Cr[i,j]-Cb[i,j]|)/3 \quad (32)$$

(2) The color response may be evaluated by using C in an LCH color space in variation (1). Namely, instead of Cdiff [i,j] in expression (32), C in the LCH color space may be evaluated.

(3) In the first and second embodiments described above, the control device installed in the digital camera 100 corrects the longitudinal chromatic aberration in an image captured at the image sensor 102 via the lens 101 by executing various types of image processing. However, the present invention is not limited to this example and a program enabling the execution of the image processing described above may be preinstalled in an electronic device such as a personal computer and an image captured with a digital camera may be taken into the electronic device via any of various types of interfaces to undergo the longitudinal chromatic aberration correction. It is to be noted that the program may be provided to the electronic device, e.g., a personal computer via a recording medium such as a CD or via an electric communication network such as the Internet.

Figure 12:
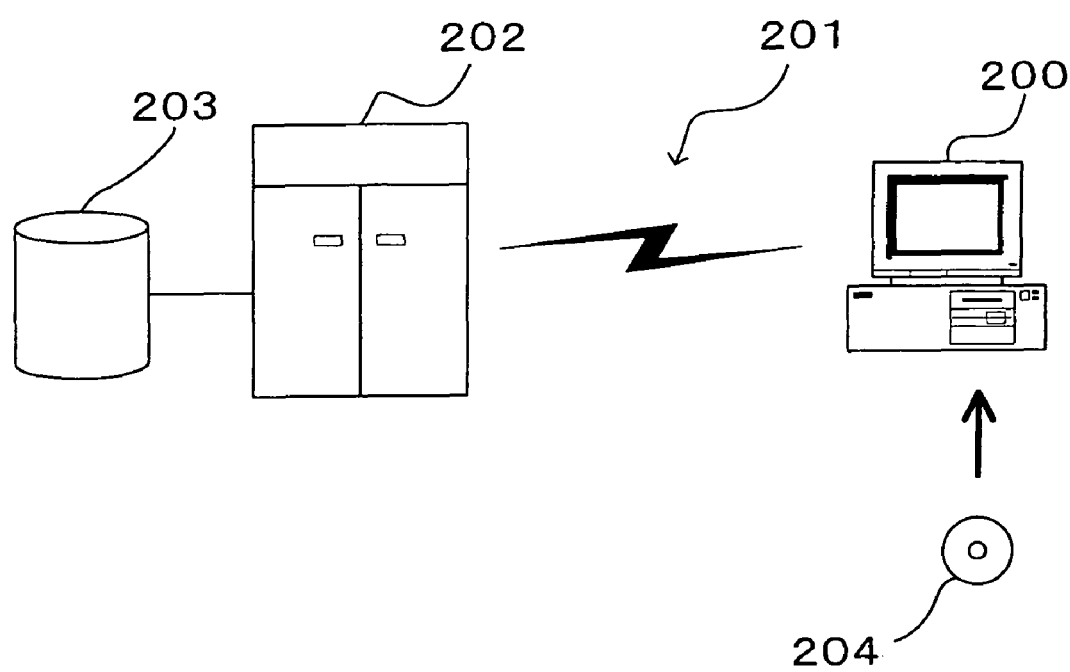

FIG. 12 shows how the program may be actually provided. A personal computer 200 receives the program via a recording medium constituted with a CD ROM 204. The personal computer 200 is capable of connecting with a communication line 201. A computer 202 is a server computer that provides the program stored in a recording medium such as a hard disk 203. The communication line 201 may be a communication network such as the Internet or it may be a dedicated communication line. The computer 202 reads out the program from the hard disk 203 and transmits the program to the personal computer 200 via the communication line 201. Namely, the program, embodied as a data signal on a carrier wave, is transmitted via the communication line 201. In other words, the program may be distributed as a computer-readable computer program product adopting any of various modes including a recording medium and a carrier wave.

It is to be noted that as long as the functions characterizing the present invention are not compromised, the present invention is not limited in any way whatsoever to the specific structures assumed in the embodiments described above.

The disclosure of the following priority application is herein incorporated by reference:
Japanese Patent Application No. 2005-284568 filed Sep. 29, 2005

The invention claimed is:

1. An image processing apparatus, comprising:
 a discriminating unit that discriminates a color component originating in an image structure in an image captured through an optical system from a color component attributable to a chromatic aberration of the optical system, wherein:
 the discriminating unit alters a sharpness of at least one color component of the captured image and discriminates the color component originating in the image structure in the captured image from the color component attributable to the chromatic aberration of the optical system based upon a difference in color response characteristics between at least two color components including the color component in correspondence to which the sharpness has been altered; and
 if the color response characteristics between the two color components is represented by a monotonically decreasing function relative to a change in the sharpness, the discriminating unit determines that the color component in correspondence to which the sharpness has been altered is a color component originating in an image structure in the captured image.

2. An image processing apparatus according to claim 1, further comprising:
 a correction unit that corrects the color component attributable to the chromatic aberration of the optical system based upon discrimination results provided by the discriminating unit.

3. An image processing apparatus, comprising:
 a discriminating unit that discriminates a color component originating in an image structure in an image captured through an optical system from a color component attributable to a chromatic aberration of the optical system, wherein:
 the discriminating unit alters a sharpness of at least one color component of the captured image and discriminates the color component originating in the image structure in the captured image from the color component attributable to the chromatic aberration of the optical system based upon a difference in color response characteristics between at least two color components including the color component in correspondence to which the sharpness has been altered; and if the color response characteristics between the two color components is represented by a function with a minimal point relative to a change in the sharpness, the discriminating unit determines the color component in correspondence to which the sharpness has been altered is a color component containing a color component attributable to a chromatic aberration of the optical system.

4. An image processing apparatus according to claim 3, wherein:

when a value assumed at the minimal point of the color response characteristics is greater than a predetermined value, the discriminating unit determines the color component in correspondence to which the sharpness has been altered is a color component originating in an image structure in the captured image.

5. An image processing apparatus according to claim 3, further comprising:

a correction unit that corrects the color component attributable to the chromatic aberration of the optical system based upon discrimination results provided by the discriminating unit.

6. An image processing apparatus, comprising:

a discriminating unit that discriminates a color component originating in an image structure in an image captured through an optical system from a color component attributable to a chromatic aberration of the optical system, wherein:

the discriminating unit alters a sharpness of at least one color component of the captured image and discriminates the color component originating in the image structure in the captured image from the color component attributable to the chromatic aberration of the optical system based upon a difference in color response characteristics between at least two color components including the color component in correspondence to which the sharpness has been altered; and the discriminating unit alters the sharpness of at least one color component so that a difference between levels of definition of at least two color components including the color component in correspondence to which the sharpness is altered is greater than a difference between levels of definition of color component attributable to a chromatic aberration of the optical system.

7. An image processing apparatus according to claim 6, further comprising:

a correction unit that corrects the color component attributable to the chromatic aberration of the optical system based upon discrimination results provided by the discriminating unit.

8. An image processing apparatus, comprising:

a discriminating unit that discriminates a color component originating in an image structure in an image captured through an optical system from a color component attributable to a chromatic aberration of the optical system, wherein:

the discriminating unit alters a sharpness of at least one color component of the captured image and discriminates the color component originating in the image structure in the captured image from the color component attributable to the chromatic aberration of the optical system based upon a difference in color response characteristics between at least two color components including the color component in correspondence to which the sharpness has been altered; and there is further provided a color response characteristics correction unit that corrects the color response characteristics in correspondence to a level of initial saturation in the captured image before the sharpness is altered for the one color component.

9. An image processing apparatus according to claim 8, further comprising:

a correction unit that corrects the color component attributable to the chromatic aberration of the optical system based upon discrimination results provided by the discriminating unit.

10. An image processing apparatus, comprising:

a discriminating unit that discriminates a color component originating in an image structure in an image captured through an optical system from a color component attributable to a chromatic aberration of the optical system, wherein:

the discriminating unit alters a sharpness of at least one color component of the captured image and discriminates the color component originating in the image structure in the captured image from the color component attributable to the chromatic aberration of the optical system based upon a difference in color response characteristics between at least two color components including the color component in correspondence to which the sharpness has been altered; and there is further provided a color response characteristics correction unit that corrects the color response characteristics when a relationship between levels indicated by values assigned to the two color components relative to each other become inverted after the sharpness for the one color component is altered.

11. An image processing apparatus according to claim 10, further comprising:

a correction unit that corrects the color component attributable to the chromatic aberration of the optical system based upon discrimination results provided by the discriminating unit.

* * * * *